(12) United States Patent
Jalali et al.

(10) Patent No.: US 9,425,889 B2
(45) Date of Patent: Aug. 23, 2016

(54) METHOD AND APPARATUS FOR IMPROVED NON-GEOSTATIONARY COMMUNICATIONS

(71) Applicant: QUALCOMM Incorporated, San Diego, CA (US)

(72) Inventors: Ahmad Jalali, Rancho Santa Fe, CA (US); William Giffin Ames, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 14/224,941

(22) Filed: Mar. 25, 2014

(65) Prior Publication Data
US 2015/0162975 A1 Jun. 11, 2015

Related U.S. Application Data

(60) Provisional application No. 61/874,459, filed on Sep. 6, 2013.

(51) Int. Cl.
*H04B 7/185* (2006.01)
*H04W 16/28* (2009.01)

(52) U.S. Cl.
CPC ...... *H04B 7/18513* (2013.01); *H04B 7/18586* (2013.01); *H04W 16/28* (2013.01)

(58) Field of Classification Search
USPC ........................................ 455/12.1
See application file for complete search history.

(56) References Cited

U.S. PATENT DOCUMENTS

| 5,537,679 A * | 7/1996 | Crosbie | H04B 7/18541 342/352 |
| 6,985,454 B1 * | 1/2006 | Wiedeman | H04B 7/18589 370/316 |
| 8,135,338 B1 * | 3/2012 | Gelon | H04B 7/18521 455/13.1 |
| 8,412,851 B2 * | 4/2013 | Giffin | H04B 7/18578 709/218 |
| 8,571,499 B1 * | 10/2013 | Kirkpatrick | H04W 84/00 455/127.4 |

(Continued)

FOREIGN PATENT DOCUMENTS

| EP | 1 024 610 A2 | 8/2000 |
| EP | 1 067 713 A1 | 1/2001 |

OTHER PUBLICATIONS

International Search Report and Written Opinion—PCT/US2014/053885—ISA/EPO—Nov. 14, 2014. (10 total pages).

*Primary Examiner* — Ankur Jain
(74) *Attorney, Agent, or Firm* — Arent Fox LLP

(57) ABSTRACT

The present disclosure presents a method and an apparatus for communications in a non-geostationary orbit (NGSO) satellite network. For example, the method may include receiving data, at a relay node, from a first NGSO satellite of the NGSO satellite network, wherein the relay node is located at a boundary or a common beam area associated with the first satellite and a second satellite of the NGSO satellite network, and wherein the data is received at the relay node in response to identifying by the first NGSO satellite that an internet point of presence (IPP) is not available in at least one of a plurality of beams associated with the first NGSO satellite, and relaying the data from the relay node to a second NGSO satellite of the NGSO satellite network, wherein an IPP is available in at least one of a plurality of beams associated with the second NGSO satellite. As such, communications in a non-geostationary orbit (NGSO) satellite network may be achieved.

20 Claims, 9 Drawing Sheets

(56) References Cited

U.S. PATENT DOCUMENTS

| | | | | |
|---|---|---|---|---|
| 2002/0052180 A1* | 5/2002 | Ravishankar | H04B 7/18558 | 455/12.1 |
| 2003/0022625 A1* | 1/2003 | Otten | H04B 7/18563 | 455/13.1 |
| 2007/0155316 A1* | 7/2007 | Monte | H04B 7/195 | 455/12.1 |
| 2009/0248794 A1* | 10/2009 | Helms | H04L 12/2861 | 709/203 |
| 2011/0171901 A1* | 7/2011 | Wyler | H01Q 1/1257 | 455/9 |
| 2011/0197219 A1* | 8/2011 | Ross | H04N 7/16 | 725/31 |
| 2014/0099879 A1* | 4/2014 | Birks | H04H 20/24 | 455/3.06 |

* cited by examiner

METHOD AND APPARATUS FOR IMPROVED NON-GEOSTATIONARY COMMUNICATIONS

CLAIM OF PRIORITY UNDER 35 U.S.C. §119

The present application for patent claims priority to U.S. Provisional Patent Application No. 61/874,459, filed Sep. 6, 2013, entitled "Efficient Non-Geo Stationary-Orbit (NGSO) Satellite System for Broadband Internet Access," which is assigned to the assignee hereof, and hereby expressly incorporated by reference herein.

BACKGROUND

Aspects of the present disclosure relate generally to satellite communication systems, and more particularly, non-geostationary orbit (NGSO) satellite systems.

A NGSO satellite may have multiple beams covering its footprint. The number of beams may be chosen so that the footprint is large enough to have an Internet Point of Presence (IPP) in some location in the footprint. However, in some cases, there may not be an IPP in the footprint of a satellite, e.g., remote areas. Additionally, NGSO satellite systems may require each home or ground terminal have its own satellite antenna and communicate directly with the satellite. This may not be cost-effective for providing broadband internet services to homes and/or enterprises.

Therefore, there is a desire for a method and an apparatus for an improved NGSO satellite system to provide low cost and broadband internet access services to homes and enterprises.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for communications in a non-geostationary orbit (NGSO) satellite network. For example, in an aspect, the present disclosure presents an example method that includes receiving data, at a relay node, from a first NGSO satellite of the NGSO satellite network, wherein the relay node is located at a boundary or a common beam area associated with the first satellite and a second satellite of the NGSO satellite network, and wherein the data is received at the relay node in response to identifying by the first NGSO satellite that an internet point of presence (IPP) is not available in at least one of a plurality of beams associated with the first NGSO satellite, and relaying the data from the relay node to a second NGSO satellite of the NGSO satellite network, wherein an IPP is available in at least one of a plurality of beams associated with the second NGSO satellite.

Additionally, the present disclosure presents an example apparatus for communications in a non-geostationary orbit (NGSO) satellite network that may include means for receiving data, at a relay node, from a first NGSO satellite of the NGSO satellite network, wherein the relay node is located at a boundary or a common beam area associated with the first satellite and a second satellite of the NGSO satellite network, and wherein the data is received at the relay node in response to identifying by the first NGSO satellite that an internet point of presence (IPP) is not available in at least one of a plurality of beams associated with the first NGSO satellite, and means for relaying the data from the relay node to a second NGSO satellite of the NGSO satellite network, wherein an IPP is available in at least one of a plurality of beams associated with the second NGSO satellite.

In a further aspect, the present disclosure presents an example apparatus for communications in a non-geostationary orbit (NGSO) satellite network that may include receiving data, at a relay node, from a first NGSO satellite of the NGSO satellite network, wherein the relay node is located at a boundary or a common beam area associated with the first satellite and a second satellite of the NGSO satellite network, and wherein the data is received at the relay node in response to identifying by the first NGSO satellite that an internet point of presence (IPP) is not available in at least one of a plurality of beams associated with the first NGSO satellite, and relaying the data from the relay node to a second NGSO satellite of the NGSO satellite network, wherein an IPP is available in at least one of a plurality of beams associated with the second NGSO satellite.

Furthermore, in an aspect, the present disclosure presents an example computer program product for communications in a non-geostationary orbit (NGSO) satellite network that may include a non-transitory computer-readable medium with code executable by a computer for receiving data, at a relay node, from a first NGSO satellite of the NGSO satellite network, wherein the relay node is located at a boundary or common beam area associated with the first satellite and a second satellite of the NGSO satellite network, and wherein the data is received at the relay node in response to identifying by the first NGSO satellite that an internet point of presence (IPP) is not available in at least one of a plurality of beams associated with the first NGSO satellite, and relaying the data from the relay node to a second NGSO satellite of the NGSO satellite network, wherein an IPP is available in at least one of a plurality of beams associated with the second NGSO satellite.

In an additional aspect, the present disclosure presents an example method and apparatus for communications in a non-geostationary orbit (NGSO) satellite network. For example, in an aspect, the present disclosure presents an example method that may include receiving data from a NGSO satellite of a NGSO satellite network at a first ground terminal, wherein the first ground terminal is a designated ground terminal with a satellite communication link to the NGSO satellite, and transmitting the data from the first ground terminal to one or more second ground terminals, wherein the data is forwarded from the first ground terminal to the one or more second ground terminals via terrestrial communication links.

Further, the present disclosure presents an example apparatus for communications in a non-geostationary orbit (NGSO) satellite network that may include means for receiving data from a NGSO satellite of a NGSO satellite network at a first ground terminal, wherein the first ground terminal is a designated ground terminal with a satellite communication link to the NGSO satellite, and transmitting the data from the first ground terminal to one or more second ground terminals, wherein the data is forwarded from the first ground terminal to the one or more second ground terminals via terrestrial communication links.

Furthermore, in an aspect, the present disclosure presents an example apparatus for communications in a non-geostationary orbit (NGSO) satellite network that may include receiving data from a NGSO satellite of a NGSO satellite network at a first ground terminal, wherein the first ground terminal is a designated ground terminal with a satellite communication link to the NGSO satellite, and transmitting the data from the first ground terminal to one or more second ground terminals, wherein the data is forwarded from the first ground terminal to the one or more second ground terminals via terrestrial communication links.

In an additional aspect, the present disclosure presents an example computer program product for communications in a non-geostationary orbit (NGSO) satellite network that may include a computer program product for communications in a non-geostationary orbit (NGSO) satellite network with a non-transitory computer-readable medium comprising code executable by a computer for receiving data from a NGSO satellite of a NGSO satellite network at a first ground terminal, wherein the first ground terminal is a designated ground terminal with a satellite communication link to the NGSO satellite, and transmitting the data from the first ground terminal to one or more second ground terminals, wherein the data is forwarded from the first ground terminal to the one or more second ground terminals via terrestrial communication links.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to communications in a non-geostationary orbit (NGSO) satellite network.

Figure 1:
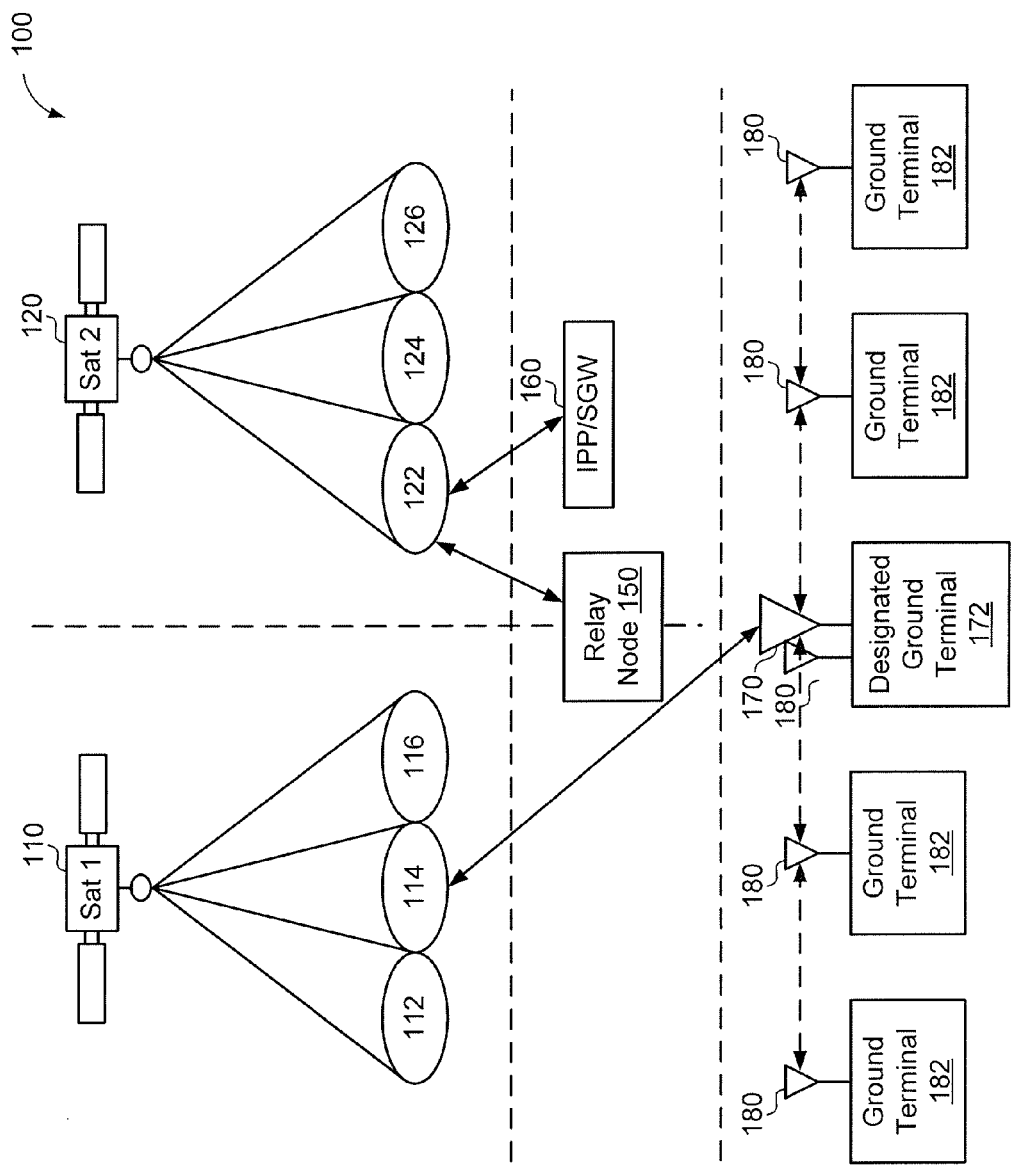
FIG. 1 is a diagram illustrating an example network in aspects of the present disclosure.

Referring to FIG. 1, a non-geostationary orbit (NGSO) or low earth orbit (LEO) satellite network 100 is illustrated that facilitates communications for providing broadband Internet access services to homes and/or enterprises. In an aspect, system 100 includes a network of NGSO satellites, for example, NGSO satellites 110 and/or 120 that may communicate with each other, either indirectly or directly.

In an aspect, satellites 110 and 120 may communicate with each other, or with other satellites in satellite network 100, indirectly via a relay node 150. For example, in an aspect, relay node 150 may be configured to act as an intermediary for receiving data (or traffic) from satellite 110 and transmitting data to satellite 120 and/or receiving data from satellite 120 and transmitting data to satellite 110. In an aspect, relay node 150 may be located at a boundary or a common beam area associated with a first satellite and/or a second satellite, for example, satellites 110 and 120 as shown in FIG. 1.

In an aspect, satellites 110 and/or 120 may be configured with multiple beams so that the footprint of a satellite covers a few thousand kilometers. For example, satellite 110 may be configured with beams 112, 114, and/or 116, and satellite 120 may be configured with beams 122, 124, and/or 126. Although, satellites 110 and 120 are shown with three beams (FIG. 1), each of the satellites in NGSO satellite network 100 may be configured with any number of beams, e.g., ten, twenty, thirty, forty, or fifty beams, etc. In an example aspect, ten to fifteen beams of a NGSO satellite may be sufficient to achieve a foot print of about 4000 kilometers.

In an additional aspect, the number of beams of a satellite may be chosen in such a way that the footprint of a satellite is large enough that an Internet Point of Presence (IPP) 160 exists in at least one location in the footprint of the satellite. In an additional aspect, a satellite gateway (SGW) may be built at the IPP to provide a communication path to the Internet. That is, data or traffic from homes and/or enterprises will be sent to a satellite and then relayed from the satellite to the satellite gateway at the IPP to be routed to the Internet. Likewise, data destined to homes and/or enterprises in the coverage area of a NGSO satellite is sent via the IPP of the satellite to be transmitted to the homes/enterprises. In an additional or optional aspect, IPP/SGW 160 may have connectivity to one or more beams (e.g., 112, 114, and/or 116) of satellite 110 and/or one or more beams (e.g., 122, 124, and/or 126) of satellite 120.

In an aspect, when there is no IPP in the footprint of a satellite, one or more relay nodes may be used to facilitate communications for providing broadband Internet access to homes and/or enterprises. For example, in an aspect, relay node 150 present within the footprint of a satellite and/or at boundaries of satellites may assist in providing communications. For example, in an aspect, the traffic from one satellite (e.g., satellite 110) which does not have an IPP in its footprint would be sent to relay node 150, which may be located at the boundary of satellites 110 and 120. The relay node 150 would in turn relay (i.e., transmit or forward) the traffic from satellite 110 to the neighboring satellite, e.g., satellite 120. If the neighboring satellite, satellite 120 has an IPP in its footprint, then satellite 120 will transmit the traffic received from satellite 110 to IPP/SGW 160 to be routed to the Internet to be delivered to one or more ground terminals 172 and 182. In an additional or optional aspect, satellites may be configured to determine which relay nodes to use depending on the location of the neighboring satellites and/or location of the ground terminals for which the data is intended.

In an additional aspect, on board switching of traffic or routing traffic from one satellite to another satellite in order to reach an IPP is not needed as a network of multi-beam NGSO satellites working in conjunction with a relay node and/or an IPP provides simple and low cost mechanism for providing broadband internet services to homes and/or enterprises. In an additional aspect, the mechanism described above may provide higher capacity as each satellite has multiple beams and also may not have on-board satellite processing and routing and/or on-board transponder functionality.

In an aspect, one or more ground terminals (e.g., 172) may be configured as a designated ground terminal 172. For example, in an aspect, a designated ground terminal may be configured with a satellite antenna 170 and a terrestrial antenna 180. The satellite antenna 170 may be relatively larger than the terrestrial antenna 180 to support high data rate communications and to keep the cost of satellites low. For example, if the satellite antenna 170 of designated ground terminal 172 is not large enough, satellites 110 and 120 may be required to transmit at higher power (e.g., higher equivalent isotropically radiated power (EIRP)) and/or have high figure of merit (e.g., G/T) to achieve high data rates to/from the satellites from/to the terminals, wherein G/T is the figure of merit for a satellite system, where G is the receive antenna gain, and T is the system noise temperature which may include the antenna noise temperature and receiver noise temperature. Additionally, high EIRP from a satellite may require a large antenna and/or high power amplifier (PA) power at the satellite which in turn would require high DC power at the satellite and would increase the satellite cost.

Additionally, the mechanism described above in reference to FIG. 1 for designated ground terminals use larger antennas for satellite links without increasing the cost of the ground network as the use of large antennas at the ground terminals (e.g., designated ground terminal) would provide various benefits. For example, one benefit would be to reduce the EIRP and G/T requirements at the satellite, thereby reducing the satellite cost as described above. An additional benefit would be to increase the capacity of the link from a satellite to a designated ground terminal and vice versa. The increased capacity would help reduce the number of satellites that are needed, which in turn would reduce the space segment cost.

In an additional aspect, terrestrial antenna 180 of designated ground terminal 172 supports terrestrial communications with other ground terminals 182. That is, the data received at satellite antenna 170 of designated ground terminal 172 may be distributed to the various ground terminals 182 via terrestrial antenna 180 of designated ground terminal 172. In an additional aspect, antennas 170 and 180 of designated ground terminal 172 may be co-located at designated ground terminal 172. In an optional aspect, antennas 170 and 180 may be integrated as well.

For example, the data from the designated ground terminal would be distributed to other terminals using terrestrial links and the communication mechanism between the ground terminals may take place in a number of ways. For example, in an aspect, the terrestrial links may be a star network where each ground terminal would directly communicate with the designated ground terminal wirelessly using a terrestrial antenna. In an additional aspect, the data from the designated home terminal may be transmitted to other ground terminals using an ad-hoc or a mesh network between the ground terminals. For example, in an aspect, each ground terminal may have an antenna which it would use to establish a connection with neighboring ground terminals. Each ground terminals would relay the data from other ground terminals to the next ground terminal in the chain until the stream of aggregated data reaches the designated ground terminal which could then send the aggregated data to the satellite, e.g., satellite 120 and the satellite would send the data to the internet as described above.

The data from the Internet would then be sent from the satellite to the designated ground terminal and then distributed to other homes using the same ad-hoc network described above. Therefore, in the aspect described above, a combination of satellite connections and a terrestrial ad-hoc network to provide connectivity from the ground terminals to the internet is described.

In an additional aspect, the mechanism that is used for backhaul between small cells may be used for the terrestrial ad-hoc network described above. For example, this may be a hybrid of designated ground terminals and terrestrial ad-hoc network based backhaul system. This approach would keep the costs of ground network at roughly the same cost as having satellite modems/antennas at each home while reducing the cost of the space segment by increasing the satellite link capacity.

In an aspect, Incremental Redundancy (IR) may used for the satellite links. For example, the carrier to interference ratio (C/I) seen by a designated ground terminal on the downlink from a satellite to the designated ground terminal or the C/I seen on the uplink at the satellite can vary depending on the location of the designated ground terminal. The C/I may be based on whether or not the adjacent beams or other designated ground terminals are transmitting with different gain of the respective satellite beam as the NGSO satellites move.

In an aspect, in order to maintain low packet error rates on transmissions from satellites 110 and 120, and/or transmissions to satellites 110 and 120, data could be transmitted conservatively, for example, low data rates. This may ensure that even if the carrier-to-interference ratio (C/I) drops due to interference during a time slot, the packet transmitted/received is still decoded correctly with a high probability. However, the conservative choice of a lower data rate may result in lowering the satellite capacity and higher number satellites for the same target network capacity.

For example, as NGSO or LEO satellites move in the sky, the gain of their beams as seen by a given ground terminal (e.g., designated ground terminal 172) may change if a satellite beam is not dynamically steered to keep a constant gain on a given designated ground terminal. However, steering the satellite beam as the satellite moves in order to keep a constant gain at a given location may be costly for the satellite. Although, the fading on a link in a NGSO satellite system with narrow beams is very low, the above artifacts may still result in a dynamically changing C/I at the designated ground terminal on the downlink or at the satellite on the uplink.

In an additional aspect, incremental redundancy (IR) may be used to support more aggressive data rates without increasing packet error rates. For example, in an aspect, the data is encoded using a low error correction code and uses a small amount of redundancy bits in the first transmission, i.e. chooses a high rate error correction code on first transmission to achieve a high data rate. However, if the packet sees high interference or low signal strength and the receiver is not able to successfully decode the packet, then the transmitter sends additional redundancy bits which would be combined with the initial transmission (i.e., first transmission) and a further attempt is made to decode the packet. This process is continued until the packet is successfully decoded.

In an aspect, IR provides a mechanism that allows choice of an aggressive data rate which closely matches the available C/I and increases the network capacity. However, as a packet may need transmission of multiple redundancy packets before the data is decoded, the decoding delay may be increased. However, one can see that even if as many as 3 transmissions are allowed the total decoding delay may still be tolerable as one way delay for NGSO or LEO satellites may be as low as 3 msec between ground terminals (e.g., designated ground terminals) and the satellites (e.g., 110 or 120). Therefore, for many applications such as web browsing and streaming, this delay is tolerable.

In an additional aspect, in streaming applications which have high bandwidth requirement this additional delay can easily be mitigated by allowing a small elastic buffer. For example, the amount of IR may be adjusted per specific application. Additionally, the capacity increase due to IR can be quite high it is worth implementing it in a satellite system to increase the satellite capacity and therefore reduce the number if required satellites and the space segment cost of the system. In an aspect, in order to reduce the delay due to IR the satellite may include a modem on board to allow decoding the packets, i.e. implementing IR at the satellite, in order to avoid sending packets to the ground station and incur additional delay. In an additional aspect, IR may be configured in conjunction with on board modulation/demodulation.

In an aspect, a frequency reuse of one (or reuse of 1) may be used to take advantage of traffic variations and the fact that all beams and/or all terminals are not transmitting in all slots. That is, the drawbacks related to unknown C/I variation described above may be solved using IR. This may result in increase of 1 to 2 dB in the average C/I when compared to a scenario where all beams and terminals are constantly transmitting. In an example aspect, a combination of IR and frequency reuse of one may result in higher capacity than high frequency reuse schemes.

In an additional aspect, an increase in capacity may be achieved by dividing the satellites or their beams into multiple rows and having each row use one of two different frequencies, or each alternating row use the same frequency but different antenna polarization (e.g., left or right). In an optional aspect, the plurality of beams associated with a satellite may be grouped, segregated into multiple rows and/or other segregating patterns. In an example aspect, this may result in at least C/I of 0 dB even at beam boundaries.

In an aspect, more power may be allocated to the downlink/uplink of terminals/applications that do not use IR. This may improve the C/I of terminals that have delay sensitive traffic and cannot tolerate IR delay while using frequency reuse of one. For example, in an aspect, some time slots may be assigned to use higher power if needed. And the terminals can use higher power in these time slots if they are sending delay sensitive data and are not using IR, otherwise they would use nominal TX power even in these time slots. In an additional or optional aspect, one terminal may be allowed higher power in the designated time slots to ensure that the specific terminal achieves higher C/I. In other words, one may allow higher C/I for certain terminals even in frequency reuse of one by transmitting higher power for that terminal.

Figure 2:
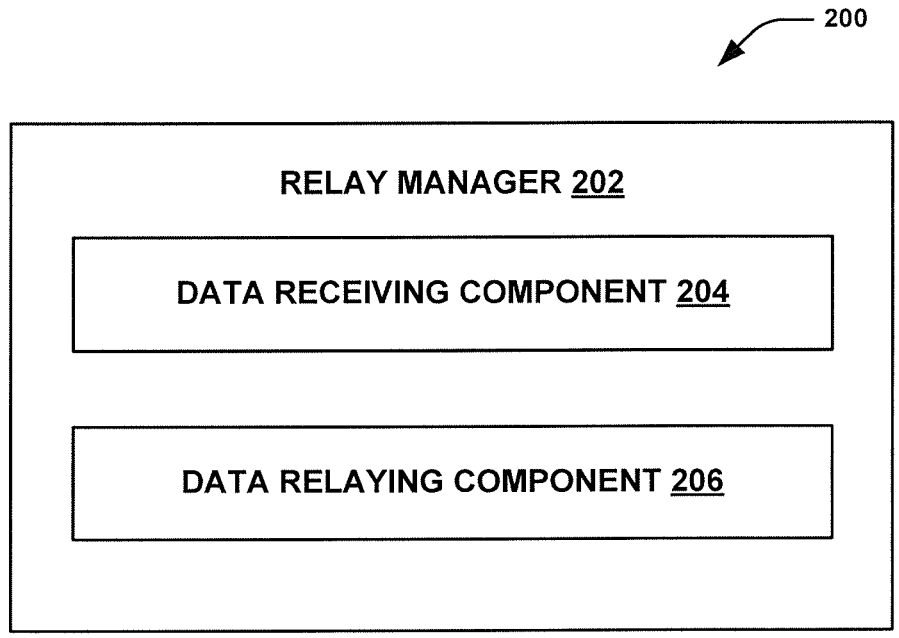
FIG. 2 is a block diagram illustrating an example relay manager in aspects of the present disclosure.

FIG. 2 illustrates an example relay manager 202 and various components that may be included in some aspects of relay manager 202 for communications in a non-geostationary orbit (NGSO) satellite network.

For example, in an aspect, relay manager 202 may include one or more of a data receiving component 204 and/or a data relaying component 206. For example, in an aspect, when satellite 110 tries to transmit data to an Internet Point of Presence or a satellite gateway in the footprint associated with satellite 110, satellite 110 may identify that an IPP is not available in its footprint. This may result in satellite 110 sending data to a relay node, e.g., relay node 150.

In an aspect, relay manager 202 and/or data receiving component 204 may be configured to receive data from a first NGSO satellite of the NGSO satellite network. For example, in an aspect, data receiving component 204 may be configured to receive data from satellite 110 when satellite 110 transmits data to the relay node after identifying that an IPP is not available in at least one of beams 112, 114, and/or 116 associated with satellite 110. In an additional aspect, the relay node may be located at a boundary or a common beam area associated with the first and/or second satellites, e.g., satellites 110 and 120, and configured to communicate with satellite 120.

In an aspect, relay manager 202 and/or data relaying component 206 may be configured to relay the data from the relay node to a second NGSO satellite of the NGSO satellite network. For example, in an aspect, data relaying component 206 may be configured to relay the data received from satellite 110 to satellite 120. In an optional aspect, satellite 110 may select the relay node based on whether the relay node selected can communicate with a satellite that has an IPP in its footprint. In an example aspect, a relay node may store a listing of satellites that the relay node can communicate with so that a satellite (e.g., satellite 110) may use the information for determining which relay node to use.

In an additional or optional aspect, relay manager 202 may be configured to receive and/or to transmit data encoded with incremental redundancy (IR). This allows satellite 110 to transmit data to the relay node at a higher data rate while at the same time increasing the capacity of the satellite. In a further additional aspect, IR may be used for transmitting data from the relay node to satellite 120.

Figure 3:
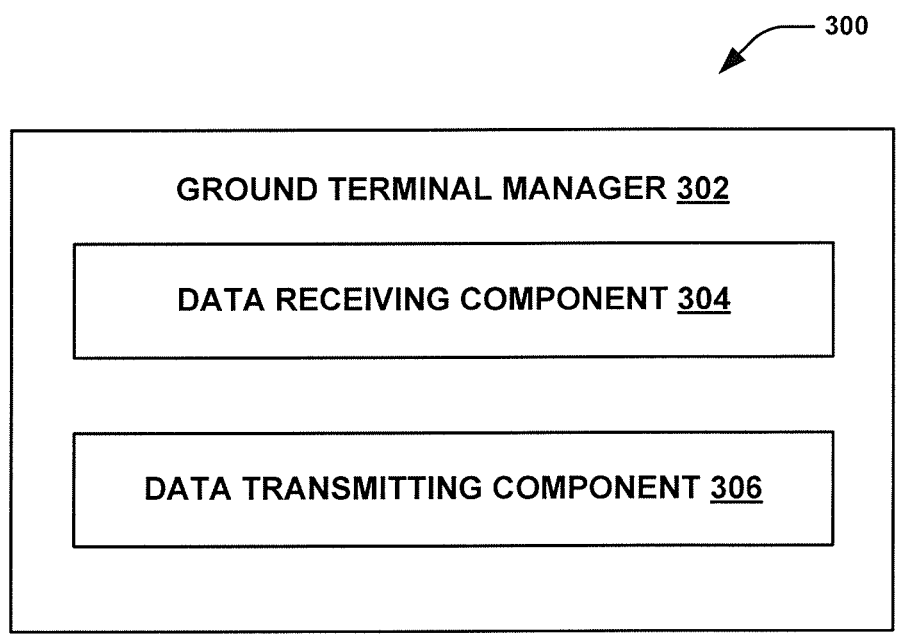
FIG. 3 is a block diagram illustrating an example ground terminal manager in aspects of the present disclosure.

FIG. 3 illustrates an example ground terminal manager 302 and various components that may be included in some aspects of ground terminal manager 302 for communications in a non-geostationary orbit (NGSO) satellite network.

For example, in an aspect, ground terminal manager 302 may include one or more of a data receiving component 304 and/or a data transmitting component 406.

In an aspect, ground terminal manager 302 and/or data receiving component 304 may be configured to receive data from a NGSO satellite of a NGSO satellite network at a first ground terminal, wherein the first ground terminal is a designated ground terminal with a satellite communication link to a NGSO satellite. For example, in an aspect, data receiving component 304 may be configured to receive data from satellite 110 and/or 120.

In an aspect, ground terminal manager 302 and/or data transmitting component 306 may be configured to transmit the data from the first ground terminal to one or more second ground terminals, wherein the data is forwarded from the first ground terminal to the one or more second ground terminals via terrestrial communication links. For example, in an aspect, ground terminal manager 302 and/or data transmitting component 306 may be configured to transmit (e.g., distribute) data received from the satellite gateway 164 to one or more ground terminals 182. In an aspect, the designated terminal may use terrestrial antenna 180 to distribute data or traffic to other ground terminals 182.

Figure 4:
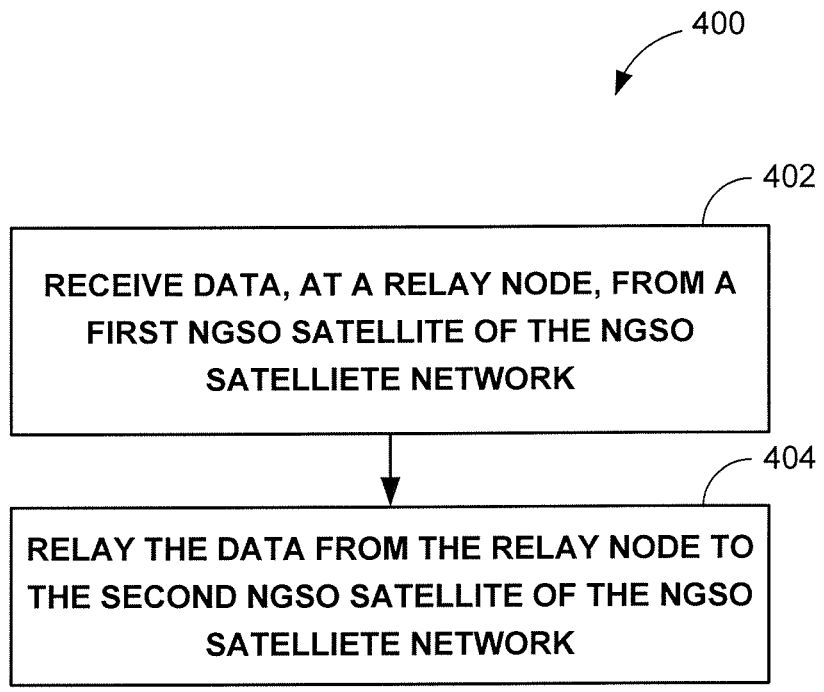
FIG. 4 illustrates an example flow chart for communications in a non-geostationary orbit (NGSO) satellite network in aspects of the present disclosure.
Figure 5:
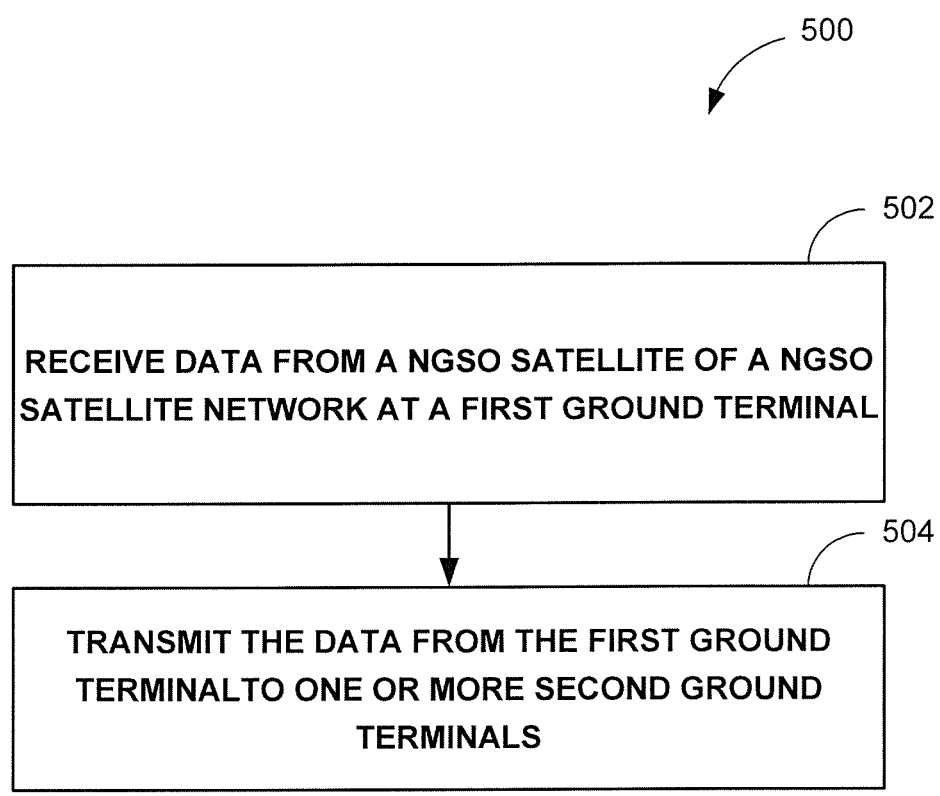
FIG. 5 illustrates an additional example flow chart for communications in a non-geostationary orbit (NGSO) satellite network in aspects of the present disclosure.

FIG. 4 illustrates an example methodology 400 for communications in a non-geostationary (NGSO) satellite network. In an aspect, at block 402, methodology 400 may include receiving data, at a relay node, from a first NGSO satellite of the NGSO satellite network, wherein the relay node is located at a boundary or a common beam area associated with the first satellite and a second satellite of the NGSO satellite network. For example, relay manager 202 and/or data receiving component 204 may receive data from a first NGSO satellite (e.g., satellite 110) of the NGSO satellite network Additionally, at block 404, methodology 400 may include relaying the data from the relay node to a second NGSO satellite of the NGSO satellite network. For example, in an aspect, relay manager 202 and/or data relaying component 206 may be configured to relay the data from the relay node (e.g., relay node 250) to a second NGSO satellite (e.g., satellite 120) of the NGSO satellite network FIG. 5 illustrates an example methodology 500 for communications in a non-geostationary (NGSO) satellite network. In an aspect, at block 502, methodology 500 may include receiving data from a NGSO satellite of a NGSO satellite network at a first ground terminal, wherein the first ground terminal is a designated ground terminal with a satellite communication link to the NGSO satellite. For example, ground terminal manager 302 and/or data receiving component 304 may receive receiving data from a NGSO satellite of a NGSO satellite network at a first ground terminal.

Additionally, at block 504, methodology 500 may include transmitting the data from the first ground terminal to one or more second ground terminals, wherein the data is forwarded from the first ground terminal to the one or more second ground terminals via terrestrial communication links. For example, in an aspect, ground terminal manager 302 and/or data receiving component 306 may be configured to transmitting the data from the first ground terminal to one or more second ground terminals.

Figure 6:
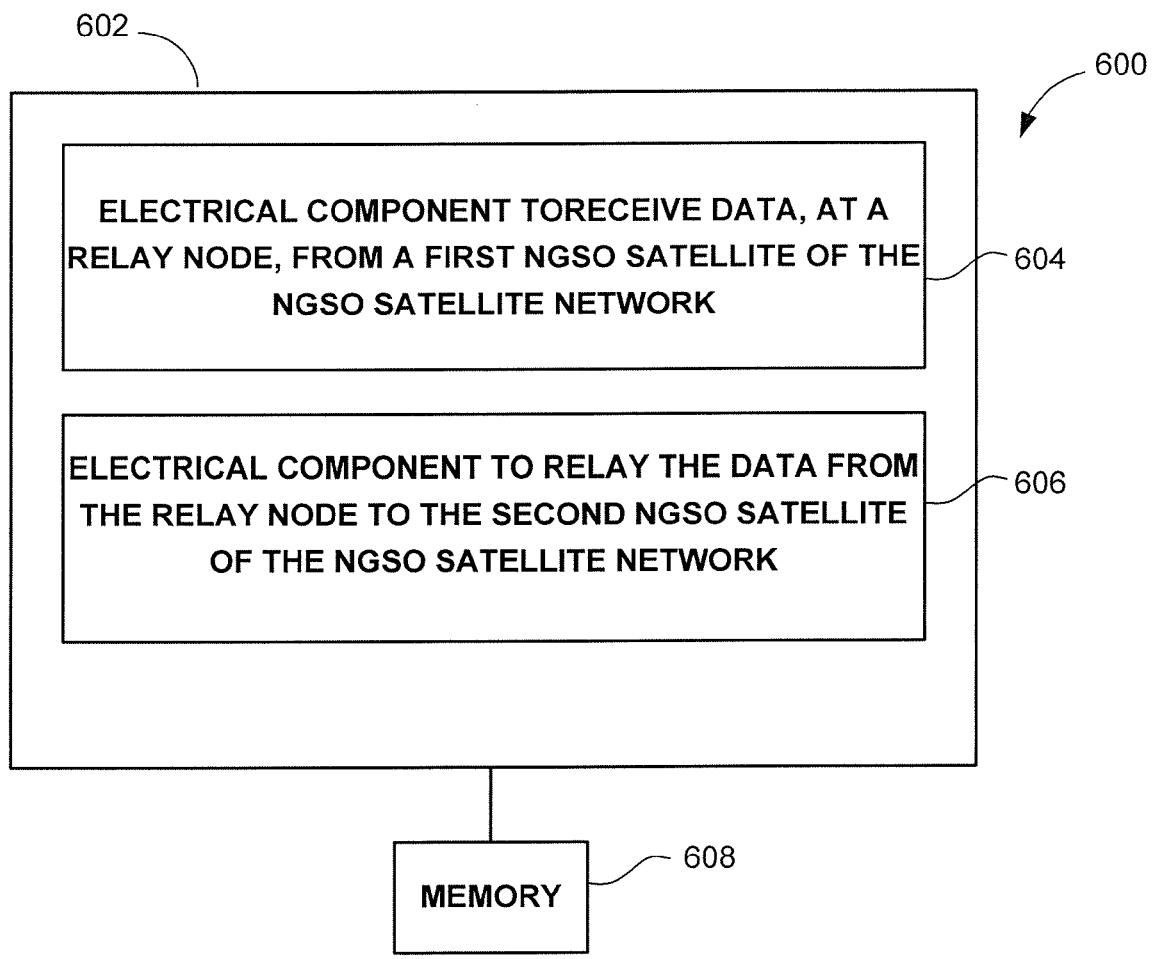
FIG. 6 illustrates an example block diagram of a logical grouping of electrical components in aspects of the present disclosure.

Referring to FIG. 6, an example system 600 is displayed for communications in a non-geostationary orbit (NGSO) satellite network.

For example, system 600 can reside at least partially within a relay node, for example, relay node 150 (FIG. 1) and/or relay manager 202 (FIGS. 1-2). It is to be appreciated that system 600 is represented as including functional blocks, which can be functional blocks that represent functions implemented by a processor, software, or combination thereof (for example, firmware). System 600 includes a logical grouping 602 of electrical components that can act in conjunction. For instance, logical grouping 602 may include an electrical component 604 to receive data, at a relay node, from a first NGSO satellite of the NGSO satellite network, wherein the relay node is located at a boundary or a common beam area associated with the first satellite and a second satellite of the NGSO satellite network, and wherein the data is received at the relay node in response to identifying by the first NGSO satellite that an internet point of presence (IPP) is not available in at least one of a plurality of beams associated with the first NGSO satellite. In an aspect, electrical component 604 may comprise relay manager 202 (FIG. 1) and/or data receiving component 204 (FIG. 2).

Additionally, logical grouping 602 may include an electrical component 606 to relay the data from the relay node to a second NGSO satellite of the NGSO satellite network, wherein an IPP is available in at least one of a plurality of beams associated with the second NGSO satellite. In an aspect, electrical component 606 may comprise relay manager 202 (FIG. 1) and/or data relaying component 206 (FIG. 2).

Additionally, system 600 can include a memory 608 that retains instructions for executing functions associated with the electrical components 604 and 606, stores data used or obtained by the electrical components 604 and 606, etc. While shown as being external to memory 608, it is to be understood that one or more of the electrical components 604 and 606 can exist within memory 608. In one example, electrical components 604 and 606 can comprise at least one processor, or each electrical component 604 and 606 can be a corresponding module of at least one processor. Moreover, in an additional or alternative example, electrical components 604 and 606 can be a computer program product including a computer readable medium, where each electrical component 604 and 606 can be corresponding code.

Figure 7:
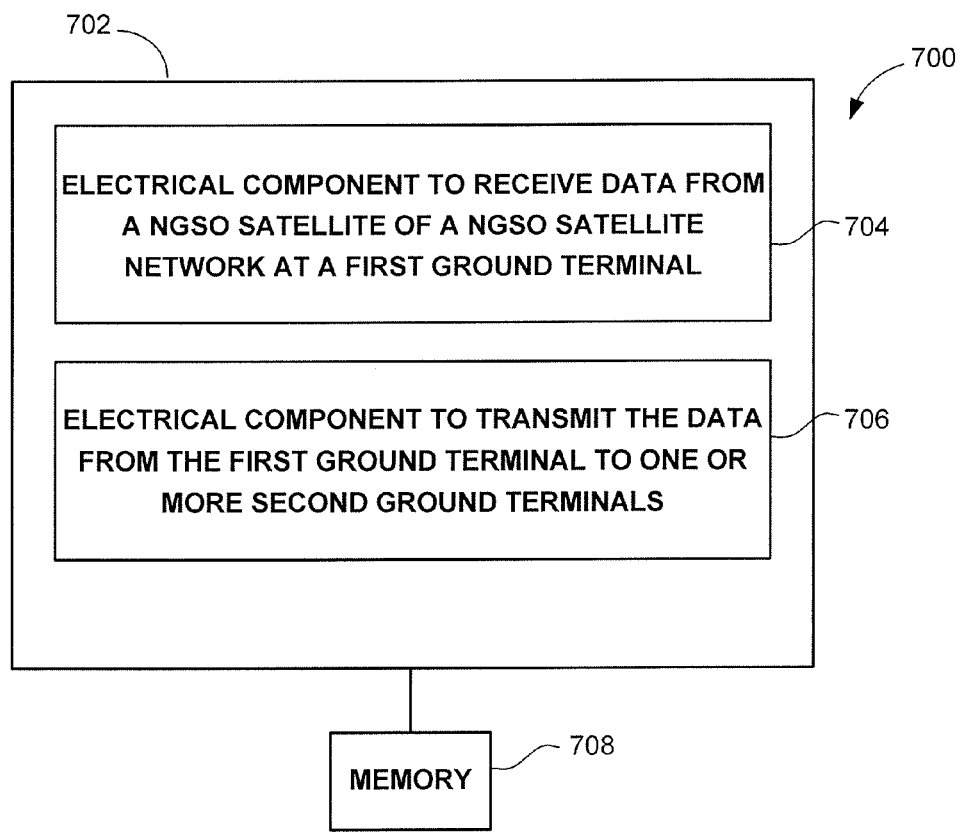
FIG. 7 illustrates an additional example block diagram of a logical grouping of electrical components in aspects of the present disclosure.

Referring to FIG. 7, an example system 700 is displayed for communications in a non-geostationary orbit (NGSO) satellite network.

For example, system 700 can reside at least partially within a designated ground terminal or a ground terminal (FIG. 1) or a ground terminal manager 302 (FIG. 3). It is to be appreciated that system 700 is represented as including functional blocks, which can be functional blocks that represent functions implemented by a processor, software, or combination thereof (for example, firmware). System 700 includes a logical grouping 702 of electrical components that can act in conjunction. For instance, logical grouping 702 may include an electrical component 704 to receive data from a NGSO satellite of a NGSO satellite network at a first ground terminal, wherein the first ground terminal is a designated ground terminal with a satellite communication link to the NGSO satellite. In an aspect, electrical component 704 may comprise designated ground terminal or a ground terminal (FIG. 1), ground terminal manager 302 (FIG. 3), and/or data receiving component 304 (FIG. 3)

Additionally, logical grouping 702 may include an electrical component 706 to transmit the data from the first ground terminal to one or more second ground terminals, wherein the data is forwarded from the first ground terminal to the one or more second ground terminals via terrestrial communication links. In an aspect, electrical component 706 may comprise designated ground terminal or a ground terminal (FIG. 1), ground terminal manager 302 (FIG. 3), and/or data transmitting component 306 (FIG. 3).

Additionally, system 700 can include a memory 708 that retains instructions for executing functions associated with the electrical components 704 and 706, stores data used or obtained by the electrical components 704 and 706, etc. While shown as being external to memory 708, it is to be understood that one or more of the electrical components 704 and 706 can exist within memory 708. In one example, electrical components 704 and 706 can comprise at least one processor, or each electrical component 704 and 706 can be a corresponding module of at least one processor. Moreover, in an additional or alternative example, electrical components 704 and 706 can be a computer program product including a computer readable medium, where each electrical component 704 and 706 can be corresponding code.

Figure 8:
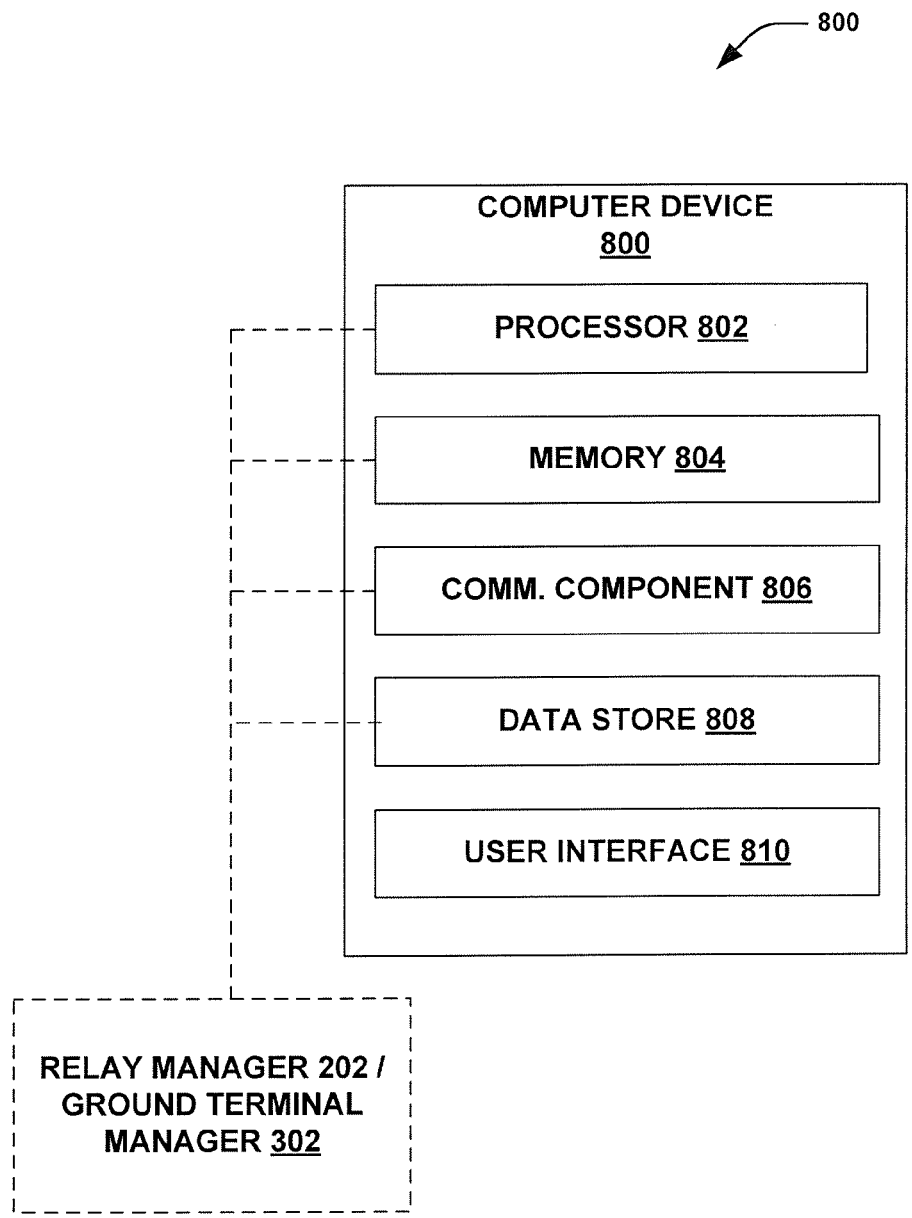
FIG. 8 is a block diagram illustrating aspects of a computer device according to the present disclosure.

Referring to FIG. 8, in an aspect, relay manager 202 and/or ground terminal manager 302 may be represented by a specially programmed or configured computer device 800. In one aspect of implementation, computer device 800 may include relay manager 202 and/or ground terminal manager 302 (FIGS. 2-3), such as in specially programmed computer readable instructions or code, firmware, hardware, or some combination thereof. Computer device 800 includes a processor 802 for carrying out processing functions associated with one or more of components and functions described herein. Processor 802 can include a single or multiple set of processors or multi-core processors. Moreover, processor 802 can be implemented as an integrated processing system and/or a distributed processing system.

Computer device 800 further includes a memory 804, such as for storing data used herein and/or local versions of applications being executed by processor 802. Memory 804 can include any type of memory usable by a computer, such as random access memory (RAM), read only memory (ROM), tapes, magnetic discs, optical discs, volatile memory, non-volatile memory, and any combination thereof.

Further, computer device 800 includes a communications component 806 that provides for establishing and maintaining communications with one or more parties utilizing hardware, software, and services as described herein. Communications component 806 may carry communications between components on computer device 800, as well as between computer device 800 and external devices, such as devices located across a communications network and/or devices serially or locally connected to computer device 800. For example, communications component 806 may include one or more buses, and may further include transmit chain components and receive chain components associated with a transmitter and receiver, respectively, or a transceiver, operable for interfacing with external devices. In an additional aspect, communications component 806 may be configured to receive one or more pages from one or more subscriber networks. In a further aspect, such a page may correspond to the second subscription and may be received via the first technology type communication services.

Additionally, computer device 800 may further include a data store 808, which can be any suitable combination of hardware and/or software, that provides for mass storage of information, databases, and programs employed in connection with aspects described herein. For example, data store 808 may be a data repository for applications not currently being executed by processor 802 and/or any threshold values or finger position values.

Computer device 800 may additionally include a user interface component 810 operable to receive inputs from a user of computer device 800 and further operable to generate outputs for presentation to the user. User interface component 810 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

Figure 9:
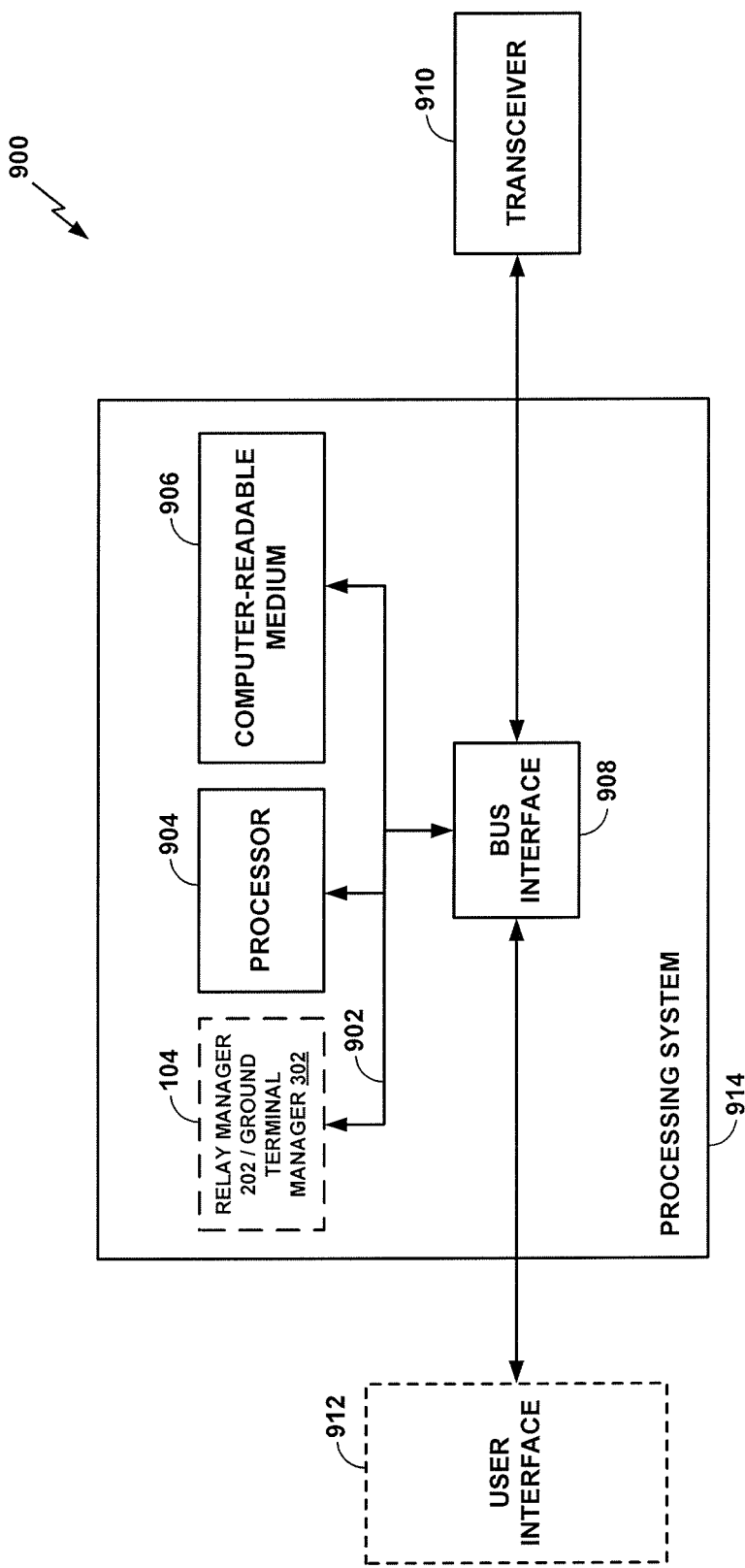
FIG. 9 is a block diagram illustrating an example of a hardware implementation for an apparatus employing a processing system.

FIG. 9 is a block diagram illustrating an example of a hardware implementation for an apparatus 900 including, for example, relay manager 202 and/or ground terminal manager 302 (FIGS. 2-3), employing a processing system 914 for carrying out aspects of the present disclosure, such as a method for communications in a non-geostationary orbit (NGSO) satellite network. In this example, the processing system 914 may be implemented with bus architecture, represented generally by a bus 902. The bus 902 may include any number of interconnecting buses and bridges depending on the specific application of the processing system 914 and the overall design constraints. The bus 902 links together various circuits including one or more processors, represented generally by the processor 904, computer-readable media, represented generally by the computer-readable medium 906, and one or more components described herein, such as, but not limited to, relay manager 202 and/or ground terminal manager 302 (FIGS. 2-3). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided.

The processor 904 is responsible for managing the bus 902 and general processing, including the execution of software stored on the computer-readable medium 906. The software, when executed by the processor 904, causes the processing system 914 to perform the various functions described infra for any particular apparatus. The computer-readable medium 906 may also be used for storing data that is manipulated by the processor 904 when executing software.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for communications in a non-geostationary orbit (NGSO) satellite network, comprising:
    receiving data, at a relay node, from a first NGSO satellite of the NGSO satellite network, wherein the relay node is located at a boundary or a common beam area associated with the first satellite and a second satellite of the NGSO satellite network, and wherein the data is received at the relay node in response to identifying by the first NGSO satellite that an internet point of presence (IPP) is not available in at least one of a plurality of beams associated with the first NGSO satellite; and
    relaying the data from the relay node to a second NGSO satellite of the NGSO satellite network, wherein an IPP is available in at least one of a plurality of beams associated with the second NGSO satellite.

2. The method of claim 1, further comprising:
    transmitting the data from the second NGSO satellite to a gateway associated with an IPP of the second NGSO satellite.

3. The method of claim 1, further comprising:
    decoding the data received from the first NGSO satellite, wherein the received data is encoded using incremental redundancy (IR) for transmitting to and receiving at the relay node.

4. The method of claim 3, wherein a beam associated with the first or the second satellite use a frequency reuse factor of one.

5. The method of claim 4, wherein the plurality of beams associated with the first or the second satellite are grouped or segregated into multiple rows with adjacent NGSO satellites or beams using different antenna polarizations for reducing interference.

6. An apparatus for communications in a non-geostationary orbit (NGSO) satellite network, comprising:
    means for receiving data, at a relay node, from a first NGSO satellite of the NGSO satellite network, wherein the relay node is located at a boundary or a common beam area associated with the first satellite and a second satellite of the NGSO satellite network, and wherein the data is received at the relay node in response to identifying by the first NGSO satellite that an internet point of presence (IPP) is not available in at least one of a plurality of beams associated with the first NGSO satellite; and
    means for relaying the data from the relay node to a second NGSO satellite of the NGSO satellite network, wherein an IPP is available in at least one of a plurality of beams associated with the second NGSO satellite.

7. The apparatus of claim 6, further comprising:
    means for transmitting the data from the second NGSO satellite to a gateway associated with an IPP of the second NGSO satellite.

8. The apparatus of claim 6, further comprising:
    means for decoding the data received from the first NGSO satellite, wherein the received data is encoded using incremental redundancy (IR).

9. The apparatus of claim 8, wherein a beam associated with the first or the second satellite use a frequency reuse factor of one.

10. The apparatus of claim 9, wherein the plurality of beams associated with the first or the second satellite are grouped or segregated into multiple rows with adjacent NGSO satellites or beams using different antenna polarizations for reducing interference.

11. An apparatus for communications in a non-geostationary orbit (NGSO) satellite network, comprising:
    receiving data, at a relay node, from a first NGSO satellite of the NGSO satellite network, wherein the relay node is located at a boundary or a common beam area associated with the first satellite and a second satellite of the NGSO satellite network, and wherein the data is received at the relay node in response to identifying by the first NGSO satellite that an internet point of presence (IPP) is not available in at least one of a plurality of beams associated with the first NGSO satellite; and
    relaying the data from the relay node to a second NGSO satellite of the NGSO satellite network, wherein an IPP is available in at least one of a plurality of beams associated with the second NGSO satellite.

12. The apparatus of claim 11, further comprising:
    transmitting the data from the second NGSO satellite to a gateway associated with an IPP of the second NGSO satellite.

13. The apparatus of claim 11, further comprising:
decoding the data received from the first NGSO satellite, wherein the received data is encoded using incremental redundancy (IR) for transmitting to and receiving at the relay node.

14. The apparatus of claim 13, wherein a beam associated with the first or the second satellite use a frequency reuse factor of one.

15. The apparatus of claim 14, wherein the plurality of beams associated with the first or the second satellite are grouped into multiple rows with adjacent NGSO satellites or beams using different antenna polarizations for reducing interference.

16. A computer program product for communications in a non-geostationary orbit (NGSO) satellite network, comprising: a non-transitory computer-readable medium comprising code executable by a computer for:
receiving data, at a relay node, from a first NGSO satellite of the NGSO satellite network, wherein the relay node is located at a boundary or common beam area associated with the first satellite and a second satellite of the NGSO satellite network, and wherein the data is received at the relay node in response to identifying by the first NGSO satellite that an internet point of presence (IPP) is not available in at least one of a plurality of beams associated with the first NGSO satellite; and
relaying the data from the relay node to a second NGSO satellite of the NGSO satellite network, wherein an IPP is available in at least one of a plurality of beams associated with the second NGSO satellite.

17. The computer program product of claim 16, further comprising:
code for transmitting the data from the second NGSO satellite to a gateway associated with an IPP of the second NGSO satellite.

18. The computer program product of claim 16, further comprising:
code for decoding the data received from the first NGSO satellite, wherein the received data is encoded using incremental redundancy (IR) for transmitting to and receiving at the relay node.

19. The computer program product of claim 18, wherein a beam associated with the first or the second satellite use a frequency reuse factor of one.

20. The computer program product of claim 19, wherein the plurality of beams associated with the first or the second satellite are grouped or segregated into multiple rows with adjacent NGSO satellites or beams using different antenna polarizations for reducing interference.

* * * * *